(12) United States Patent
Lin et al.

(10) Patent No.: US 6,352,131 B1
(45) Date of Patent: Mar. 5, 2002

(54) BICYCLE'S POWER TRAIN

(76) Inventors: Jung-Te Lin, No. 14, Ta-Hua First Road, Keelung (TW); Ruey Shong Nelson Lin, 80 S. Ranchos Legante Dr., Gilbert, AZ (US) 85296

( * ) Notice: Subject to any disclaimer, the term of this patent is extended or adjusted under 35 U.S.C. 154(b) by 0 days.

(21) Appl. No.: 09/490,943

(22) Filed: Jan. 25, 2000

(51) Int. Cl.[7] .............................................. B62M 23/02
(52) U.S. Cl. ...................... 180/207; 180/220; 280/231; 280/260
(58) Field of Search ................................. 180/205, 206, 180/207, 220, 65.1, 65.2, 65.6; 280/231, 236, 260, 261; 74/574.1; 192/41 R, 42, 45, 45.1, 45.2

(56) References Cited

U.S. PATENT DOCUMENTS

| | | | | |
|---|---|---|---|---|
| 1,094,558 A | * | 4/1914 | Harley | |
| 2,242,272 A | * | 5/1941 | Swan | |
| 5,209,507 A | * | 5/1993 | Domenge | |
| 5,740,694 A | * | 4/1998 | Nagao et al. | |
| 5,810,379 A | * | 9/1998 | Shusterman | |
| 5,845,727 A | * | 12/1998 | Miyazawa et al. | |
| 5,915,493 A | | 6/1999 | Nakayama | |

FOREIGN PATENT DOCUMENTS

| | | | |
|---|---|---|---|
| DE | 704585 | * | 2/1941 |
| FR | 358234 | * | 2/1906 |

* cited by examiner

*Primary Examiner*—Anne Marie Boehler
(74) *Attorney, Agent, or Firm*—Schmeiser, Olsen and Watts

(57) ABSTRACT

A unidirectional rotating assembly, a bicycle powering mechanism, and a bicycle using the same are disclosed. The unidirectional rotating assembly allows a chainring to rotate while the crank and axle remains still. The bicycling powering mechanism combines the unidirectional rotating assembly with a powering device. The powering device is coupled to the unidirectional rotating assembly through a drive ring. This allows the powering device to drive the unidirectional assembly, thereby driving the chainring. When the bicycling power mechanism is part of a bike, the chainring is connected to the rear wheel of the bike through a chain and rear sprockets. Because of this, the bicycling powering mechanism can propel the bike while the cranks are stationary. Additionally, a person using a bike having this configuration is still able to shift gears. Thus, the bicycling power mechanism need not be designed with gearing. The unidirectional rotating assembly can also be applied to a multi-passenger bicycle for two or more individuals riding a bicycle together.

11 Claims, 6 Drawing Sheets

BICYCLE'S POWER TRAIN

BACKGROUND OF THE INVENTION

1. Technical Field

This invention generally relates to bicycles and more specifically relates to bicycle power train improvements.

2. Background Art

Most standard bicycles use a chain to convert pedaling power from the crank arm to the rear cluster, also known as a freewheel or cassette. Pedaling force converted to the rear cluster and thereafter to the ground is determined by the ratio of the gear number between the front chainring and the rear sprocket of the cluster that are currently selected. The ratio between these two determines the target output (either higher torque or faster speed). When the ratio is small, bicycles have a larger torque (from rear wheel to the ground) and a slower speed, which is especially good for going uphill. Most standard bicycles have a gear changing device known as the derailleur. On most bikes, there are multiple front chainrings and rear sprockets, so there will be two derailleurs—a front and a rear. When the gear ratio is changed, by changing the front chainring and/or the rear sprocket (by shifting with the front or real shifters, respectively), it allows the bicycle to significantly gain speed or gain torque. The derailleur of a bicycle is convenient and comfortable; however, people have begun to affix powering devices to increase the enjoyment of riding a bicycle. This arrangement has certain drawbacks.

Furthermore, when a bicycle has more than one crank and crankset, such that the bike can hold more than one person, one of the riders might not want to turn his or her crank while the bike is moving and the other rider or riders are turning their cranks. To solve this problem, most multiple person bikes have several chains and cog systems or have other complicated systems. These systems are complex.

Without a device to allow power to more easily be transferred from a powering device to the wheels of the bike or from one rider to the wheels of the bike while another rider does not pedal, the current complexity in the bicycle's power train will not be reduced.

BRIEF SUMMARY OF INVENTION

A unidirectional rotating assembly, a bicycle powering mechanism, and a bicycle using the same are disclosed. The unidirectional rotating assembly allows a chainring to rotate while a crank and an axle remain still. The bicycling powering mechanism combines the unidirectional rotating assembly with a powering device. The powering device is coupled to the unidirectional rotating assembly through a drive ring. This allows the powering device to drive the unidirectional assembly, thereby driving the chainring. When the bicycling power mechanism is part of a bike, the chainring is connected to the rear wheel of the bike through a chain and rear sprockets. Because of this, the bicycling powering mechanism can propel the bike while the cranks are stationary. Additionally, a person using a bike having this configuration is still able to shift gears. Thus, the bicycling power mechanism need not be designed with gearing. Moreover, the rider can select the appropriate gear such that the bicycling power mechanism will not drive the bike too slowly (such as if a hill is encountered) or too fast (such as if a downhill is encountered).

This invention has the benefits of being much less complicated while giving the rider appropriate control over speed through gearing selection. Moreover, the rider need not apply any force to move the bike. However, should the rider decide to add force and thus go faster, the present invention allows the rider to do so.

The unidirectional rotating assembly can also be applied to a multi-passenger bicycle for two or more individuals riding a bicycle together. This allows one or more of the riders to provide no power input to the bike while the other rider or riders provides all the power input. The present invention has a benefit of being much less complicated than past systems. By using the unidirectional rotating assembly, the involved and complex multiple chains, cogs, and other complicated systems are not needed.

DETAILED DESCRIPTION OF INVENTION

Figure 1:
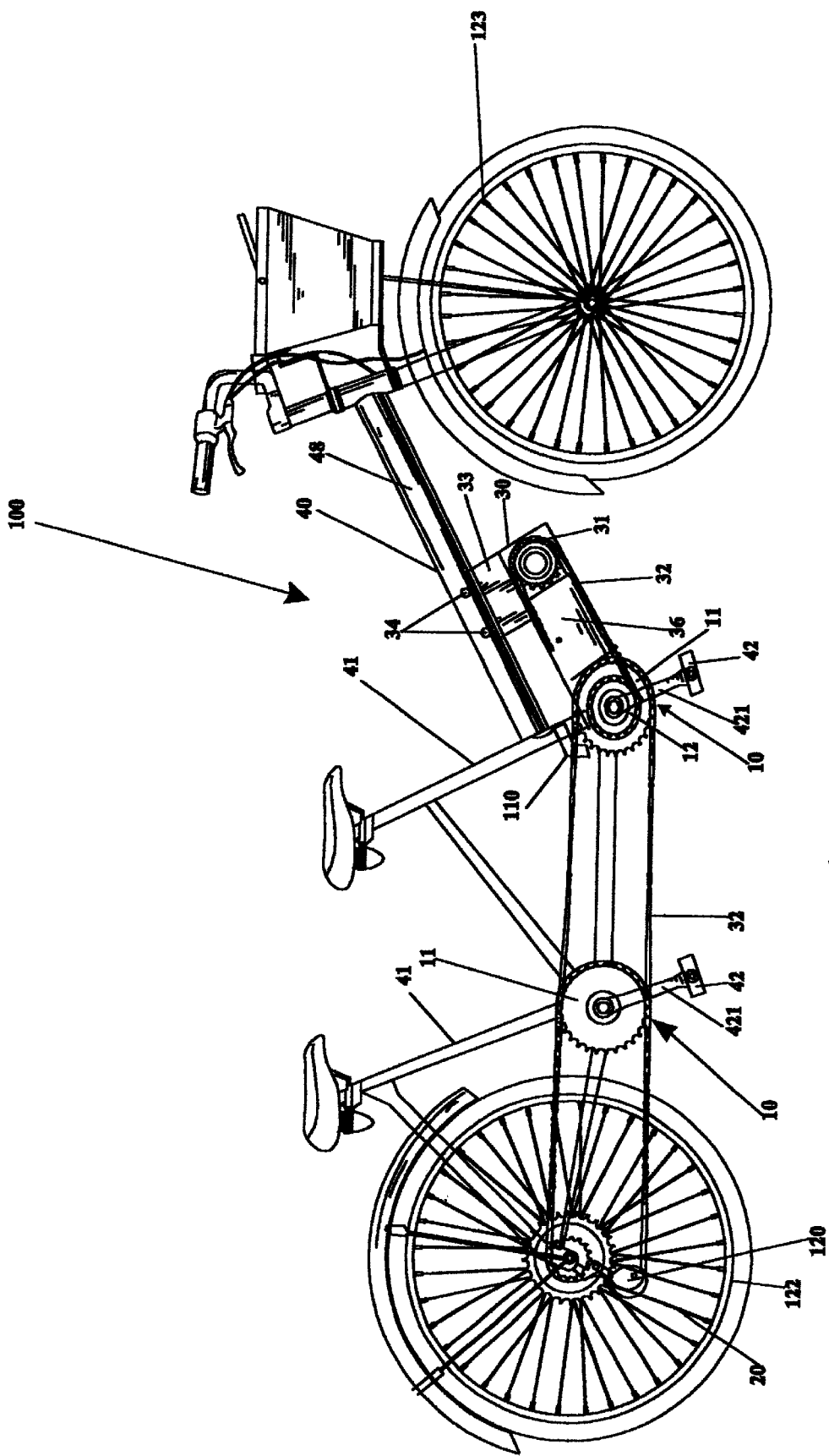
FIG. 1 shows a multiple person bicycle in accordance with a preferred embodiment of the present invention.

A unidirectional rotating assembly in accordance with the current invention couples to an axle and chainring. A unidirectional rotating assembly is a device with a structure that allows movement of the crank in a first direction to cause movement of at least one chainring in a first direction and allows movement of at least one chainring in the first direction while the crank can remain still. The preferred unidirectional rotating assemblies are a pawl assembly having several circumferentially spaced pawls that can engage circumferentially spaced engagement means and a one-way bearing. However, any device that allows the inner portion to remain still while the outer portion rotates and allows the inner portion to rotate in one direction thereby rotating the outer portion in this direction is meant to be encompassed by a "unidirectional rotating assembly".

When the unidirectional rotating assembly is used as part of a bicycle powering mechanism, the unidirectional rotating assembly preferably has a drive ring that is coupled to a powering device. This configuration allows the powering device to drive the drive ring while the inner portion of the unidirectional rotating assembly can remain still. The bicycle powering mechanism preferably comprises a powering device that drives a powering wheel, and the powering wheel is coupled to the drive ring through a power transfer mechanism.

When the unidirectional rotating assembly is part of a bicycle, the unidirectional rotating assembly will normally be coupled to the chainring or several chainrings. The chainring will be coupled to the rear cluster through a chain. The unidirectional rotating assembly then allows a chainring to rotate while the crank and axle remains still. This is particular beneficial on a multiple person bike, because the unidirectional rotating assembly allows one rider of the bike to propel the bike by turning his or her crank, while the other rider can leave his or her crank still.

When the bicycling power mechanism is part of a bike, the chainring or chainrings are connected to the rear wheel of the bike through a chain and rear sprockets. Because of this, the bicycling powering mechanism can propel the bike while the cranks are stationary. Additionally, a person using a bike having this configuration is able to still shift gears. Being able to shift gears is highly important because this allows the powering device of the bicycling power mechanism to be made without gears. Moreover, the rider or riders are able to switch gears using the normal derailleurs. This gives rider complete control over speed and torque.

Before proceeding to the detailed description of the present invention, a more in-depth analysis of the problem will be discussed. As previously indicated, people have begun to add power devices to bicycles. The powering devices generally consist of electric motors or gasoline engines. These devices have routed this additional power to the front or rear wheel axle. But placing the additional power on the wheel axle has the draw back that the power from the powering device can not go through the chain rings or rear cluster. This relationship does not allow the derailleur to change gears. Therefore, there can only be one constant force (and torque) to move the bicycle forward, unless gearing is added between the powering devices and the front or rear wheel axle. This additional gearing adds complexity and weight. If no additional gearing is added, when this bicycle is moving uphill, one can not use the derailleurs to change the gear ratio to increase torque output from the powering device. What is worse, when the bicycle speed is slowing on uphill, the rotation speed of the rear wheel will be decreased, making the powering device's speed decrease. This decreased speed not only makes the powering device run inefficiently but also reduces its life expectancy. The same problem happens when some individuals connect the powering device directly to the tire of the bicycle.

In order to allow the additional powering device to have the changing gear ratio capability, some manufactures are installing a hub gearing system to the rear bicycle wheel. This system does work. However, compared to the already existing derailleur system, the hub gearing system is more expensive, has fewer gear shifting ratios, adds complexity, and is heavy. The majority of standard hub gearing system maintains only 3 to 5 gear ratios while the derailleur mechanism is able to provide 21, 24 or even 27 gear shifting ratios.

The present invention easily and simply solves these problems with very little additional complexity and weight. Moreover, the rider is able to change the gearing by using the derailleurs as he or she sees fit. This allows all of the gearing on the bike to be used, which will allow a powering device to be more efficient and will increase the powering device's life expectancy.

Referring now to FIG. 1, a bicycle 100 is shown. Bicycle 100 comprises two chain wheel assemblies 10, frame 40, chain 32, rear wheel 122, front wheel 123, rear cluster 20, front derailleur 110, rear derailleur 120, cranks 421, and powering device 30. Frame 40 comprises downtube 48 and seattubes 41. Powering device 30 comprises powering wheel 31, power transferring mechanism 32, motor 36, and attachment plate 33. Attachment plate 33 is coupled to down tube 48 through attachment means 34. Attachment means 34 may be any mechanism that can attach powering device 30 to frame 40, such as bolts (shown in FIG. 1), welding, a clamp that attaches to plate 33 and surrounds down tube 48, etc.

The wheel assemblies 10 are mounted to the bicycle frame 40 through axles (not shown) and the axle's associated bottom brackets (not shown). Each crank 421 is coupled to its associated axle. Moving the crank in a rotational direction causes the axle to rotate. In the invention of FIG. 1, both front wheel assemblies 10 comprise unidirectional rotating assemblies (shown in upcoming figures). The unidirectional rotating assembly 10 on the on the front wheel assembly 10 (the wheel assembly nearest front wheel 123) comprises drive ring 12, which is coupled to power transfer mechanism 32 of powering device 30. This allows power in device 30 to apply power to the bike 100. The front unidirectional rotating assembly 10 also is coupled to chainring 11. Although one chainring is shown in FIG. 1, it is to be understood that the front unidirectional rotating assembly 10 may be coupled to multiple chainrings.

Because the unidirectional rotating assembly 10 is coupled to both chainring 11 and drive ring 12, either the front crank 421 may be used to power the bicycle (through the unidirectional rotating assembly 10, chainring 11, chain 32, rear sprockets 20 and rear wheel 122) or powering device 30 may be used to power the bicycle (through unidirectional rotating assembly 10, drive ring 12, chain 32, rear sprockets 20 and rear wheel 122). This dual drive capability occurs because unidirectional rotating assembly 10 is a device that allows clockwise movement of crank 421 to cause clockwise movement of chainring 11 and also allows clockwise movement of chainring 11 while crank can remain still (or be moved counterclockwise). Moreover, the unidirectional rotating assembly 10 also allows clockwise movement of crank 421 to add to rotation caused by powering device 30, as long as a clockwise movement of crank 421 is at least as high as a clockwise movement of drive ring 12 caused by powering device 30. When the rider adds additional speed in this manner, the load on powering device 30 is actually lessened.

The front wheel assembly 10 thus allows powering device 30, the rider (using front crank 421), or both to drive the bike. The unidirectional rotating assembly allows movement of crank 421 in a clockwise direction (about an axis colinear with the center of the axle—see axis 580 of FIG. 4) to cause movement of the at least one chainring in the clockwise direction, and allows movement of the at least one chainring in the clockwise direction while the crank can remain still.

The rear wheel assembly 10 (the wheel assembly nearest rear wheel 122) also preferably comprises a unidirectional rotating assembly. In this embodiment, the unidirectional rotating assembly preferably does not have the drive ring 12 but does have a chainring 11. By using a unidirectional rotating assembly in the rear wheel assembly 10, the rear rider (sitting on the seat nearest the rear wheel 122) may power the bike through clockwise turning of his or her crank 421. By using a unidirectional rotating assembly in the front wheel assembly 10, the front rider (sitting on the seat nearest the front wheel 123) may join in powering the bike, through clockwise turning of his or her crank 421, or may simply be a passive rider and not provide power to the bike. By using the unidirectional rotating assembly in the rear and front wheel assemblies, the front rider, the rear rider, or both may provide power to the bike. When powering device 30 is added to bicycle 100, even more options exist: the rear rider, front rider, powering device 30, or all three may power the bike.

Moreover, adding a unidirectional rotating assembly to the rear, front, or both wheel assemblies is much less complex than prior art multiple chain or other complex systems that allow one rider to power the bike while the other rider relaxes and simply rides along.

Figure 2:
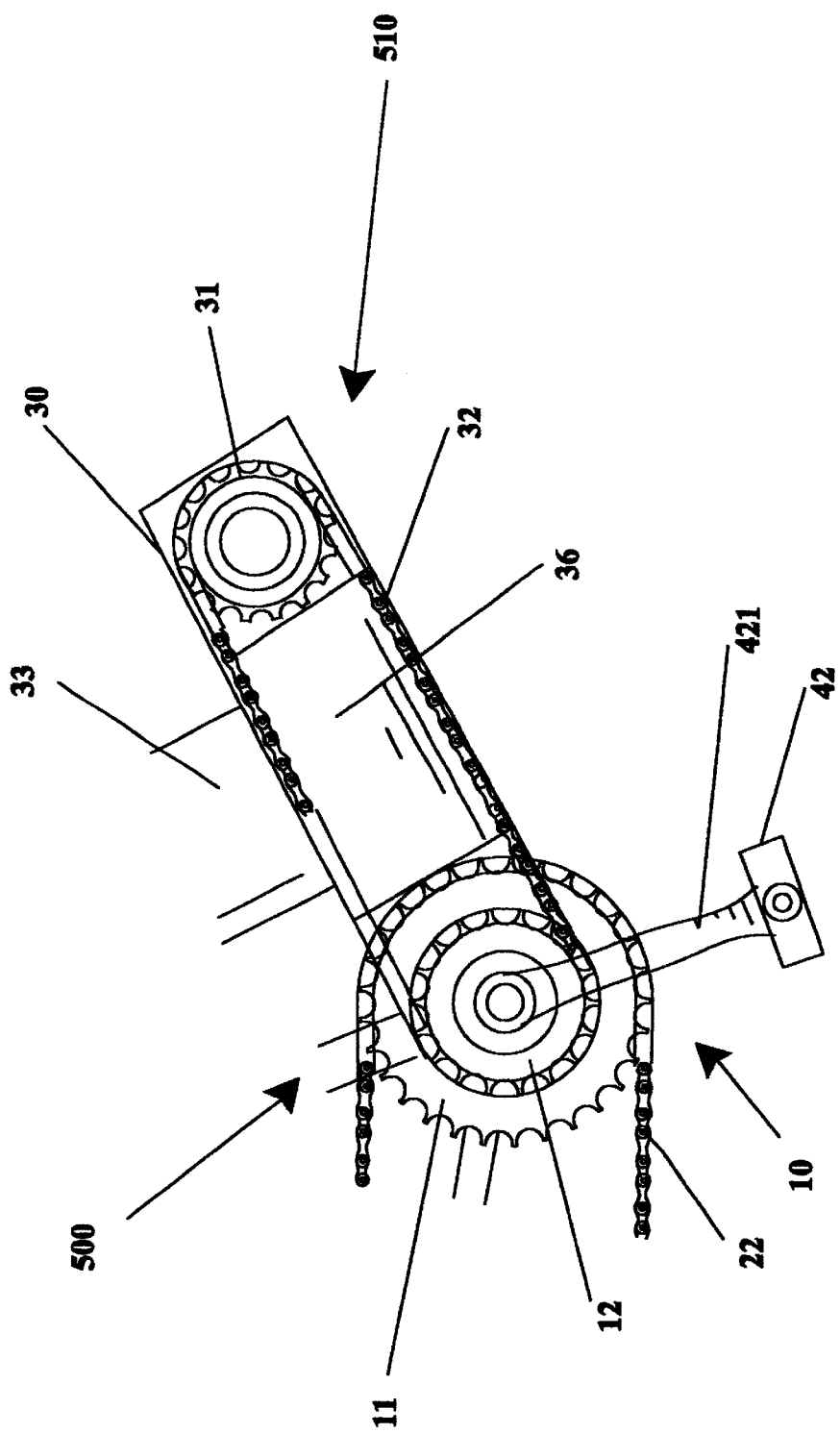
FIG. 2 shows a bike power mechanism attached to and interacting with parts of a bicycle in accordance with a preferred embodiment of the present invention.

Referring now to FIG. 2, a preferred bicycle powering mechanism is shown interacting with other bicycle parts.

Figure 3:
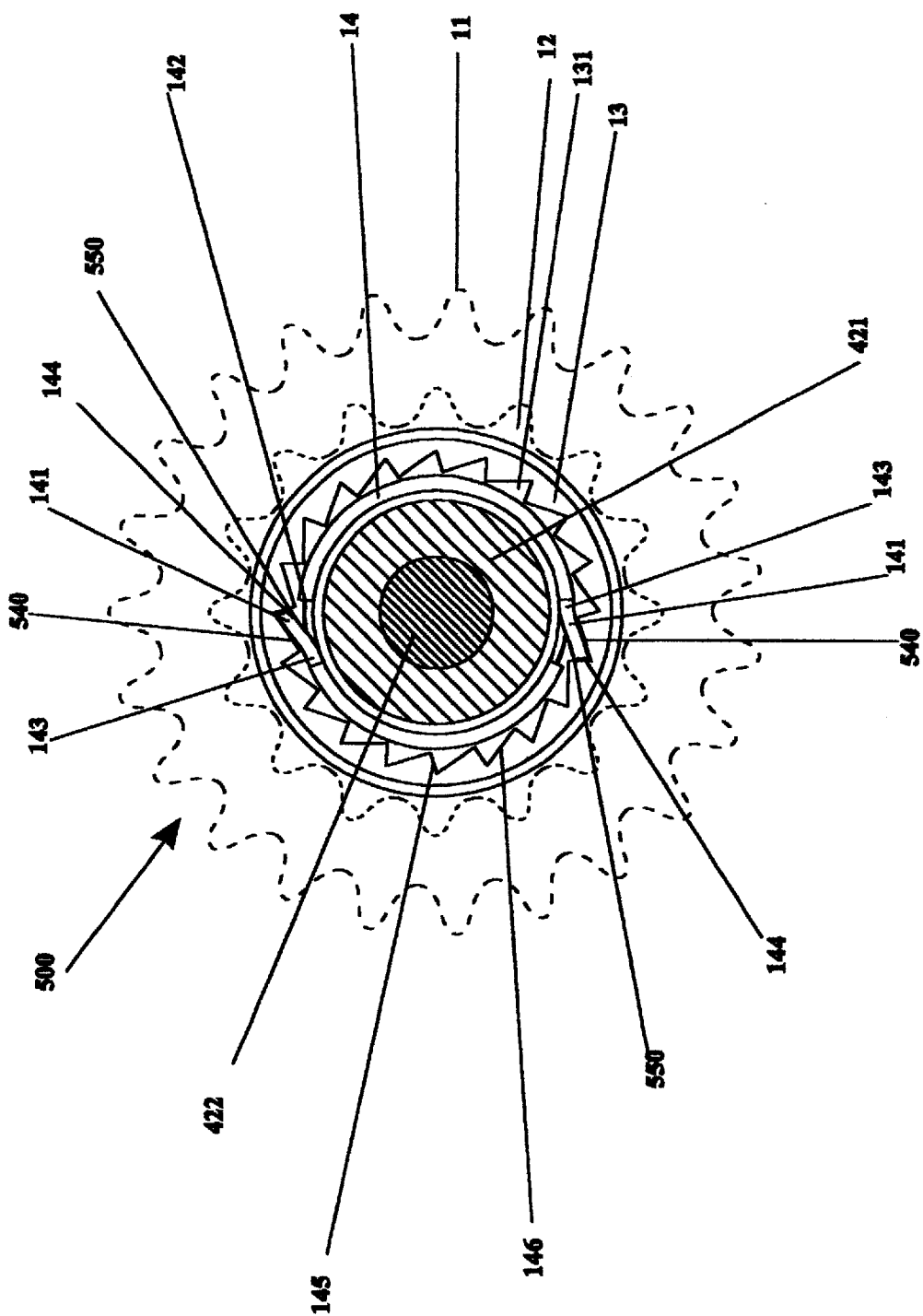
FIG. 3 shows a cross-section of a unidirectional rotating assembly in accordance with a preferred embodiment of the present invention.

Bicycle powering mechanism 510 comprises powering device 30, powering wheel 31, power transfer mechanism 32, attachment plate 33, motor 36, and unidirectional rotating assembly 500 (shown more particularly in FIG. 3). Unidirectional rotating assembly 500 comprises drive ring 12 and is coupled to chainring 11 and to an axle (not shown in FIG. 2; see FIGS. 3 through 5). The axle is coupled to crank 421. Bicycle powering mechanism 510 may also comprise crank 421 and chainrings.

Motor 36 is preferably a gasoline or electric motor, but can be any type of motor able to drive bicycle 100 (shown in FIG. 1). Motor 36 is coupled to and drives powering wheel 31. Powering wheel 31 transfers its power to power transfer mechanism 32, which is coupled to and drives drive ring 12. Preferably, power transfer mechanism 32 is a chain or belt. Powering device 30 in this embodiment drives drive ring 12 in a clockwise manner. Unidirectional rotating assembly 500 allows crank 421 to remain motionless (or to spin in a counterclockwise direction) while drive ring 12 is driven in a clockwise direction.

When a rider forces pedal 42 around in a clockwise manner, crank 421, which is coupled to an axle, will turn the axle in a clockwise direction. Unidirectional rotating assembly 500, which is also coupled to the axle, will also couple the axle to chainring 11 to turn chainring 11 clockwise. When motor 36 is not running, unidirectional rotating assembly 500 allows the rider to drive the bike by rotating pedal 42, thereby driving chain 22. When motor 36 is running, unidirectional rotating assembly 500 also allows the rider to drive the bike by rotating pedal 42, thereby driving chain 22. Note that the rotational speed of the axle must be at least as great as the rotational speed of drive ring 12 for the rider to add additional speed or torque to the bike. Additionally, unidirectional rotating assembly 500 allows drive ring 12 to be rotated in a clockwise direction while crank 421 is kept still or rotated in a counter clockwise direction. Note also that more than one powering device may be added to a bicycle. For example, a unidirectional rotating assembly could be placed on what is traditionally the non-drive side of the bike (in FIG. 1, the drive side of bicycle 100 is the side with chain 22). In this embodiment, the unidirectional assembly on the non-drive side of the bike will preferably have a drive ring but preferably will not be adapted to couple to a chainring.

When powering device 30 is not part of bicycle, unidirectional rotating assembly 500 allows the rider to either add additional speed or torque to the bike or to relax and let another rider be the power source for the bike.

Referring now to FIG. 3, this figure shows the most preferred unidirectional rotating assembly 500. Unidirectional rotating assembly 500 is shown in cross-sectional view, with drive ring 12 and chainring 11 shown for reference. Unidirectional rotating assembly 500 comprises in this example two concentrically spaced pawls 141, two concentrically pawl springs 142, a tube shaft 14, and a shaft sleeve 13 having a number of concentrically spaced engaging means 131. Pawls and pawl springs are well known in the art. For example, most rear hubs contain some type of pawl and pawl spring mechanism. Many types of pawl and pawls spring mechanisms are applicable to the current invention and FIG. 3 is only illustrative. For example, more pawls and springs may be added, or the engaging mean's and/or pawl's shape may be changed. Additionally, unidirectional rotating assembly 500 may comprise other parts to enable the unidirectional rotating assembly to be suitable for coupling to axle 422 and to be suitable for coupling to a chainring or multiple chainrings. In these examples, crank 421 and axle 422 are shown passing through opening 16 (see FIGS. 4 and 5) of unidirectional rotating assembly 500, but other mechanisms are possible. For example, tube shaft 14 could be attached to additional tubes between tube shaft 14 and crank 421. Tube shaft 14 is an inner portion of the unidirectional rotating assembly that defines an opening suitable for coupling to an axle (to be explained in more detail in reference to FIGS. 4 and 5).

Engaging means 131 can be any means that can engage pawls 141 when tube shaft 14 is moved in a clockwise direction and that will not engage pawls 141 when tube shaft 14 is moved in a counterclockwise direction or drive ring 12 is moved in clockwise direction and tube shaft 14 is still. Preferred engaging means 131 are tilted teeth, as shown in FIG. 3. Each tilted teeth 131 comprises an engaging area 145 and a tilted area 146. Each pawl 141 comprises a contact surface 540, an engaging area 144, an underside 550, and a rotational area 143. The pawl is fixed to the tube shaft through a pin (not shown). When tube shaft 14 rotates clockwise, each pawl spring forces each pawl to engage one of the engaging means. Specifically, each pawl spring contacts underside 550 and pushes up. Each contact surface 540 is guided by one of the tilted areas 146 into one of the tilted teeth 131. Engaging area 144 of a pawl will contact and engage engaging area 145 of one of the titled teeths 131. Each pawl spring will continue to force its associated pawl upward, thereby maintaining contact surface 540 in contact with tilted area 146 and engaging area 144 in contact with engaging area 145.

When tube shaft 14 rotates clockwise, or shaft sleeve 13 rotates clockwise and tube shaft 14 is still or rotates counterclockwise or rotates clockwise at a slower rate than shaft sleeve 13, the tilted area 146 of one of the tilted teeth 131 will contact the contact surface 540 of one of the pawls. This action will compress the pawl spring 142 and force the pawl 141 in the direction of axle 422. Pawl 141 rotates about rotational area 143 such that underside 550 will be drawn toward axle 422. In this position, the shaft sleeve 13 can easily and freely rotate. It should be noted that while only one pawl spring is shown per pawl, there may be more than one pawl spring per pawl.

In FIG. 3, sleeve 13 is preferably connected to drive ring 12 and the unidirectional rotating assembly is suitable for coupling to a chainring or multiple chainrings.

Figure 4:
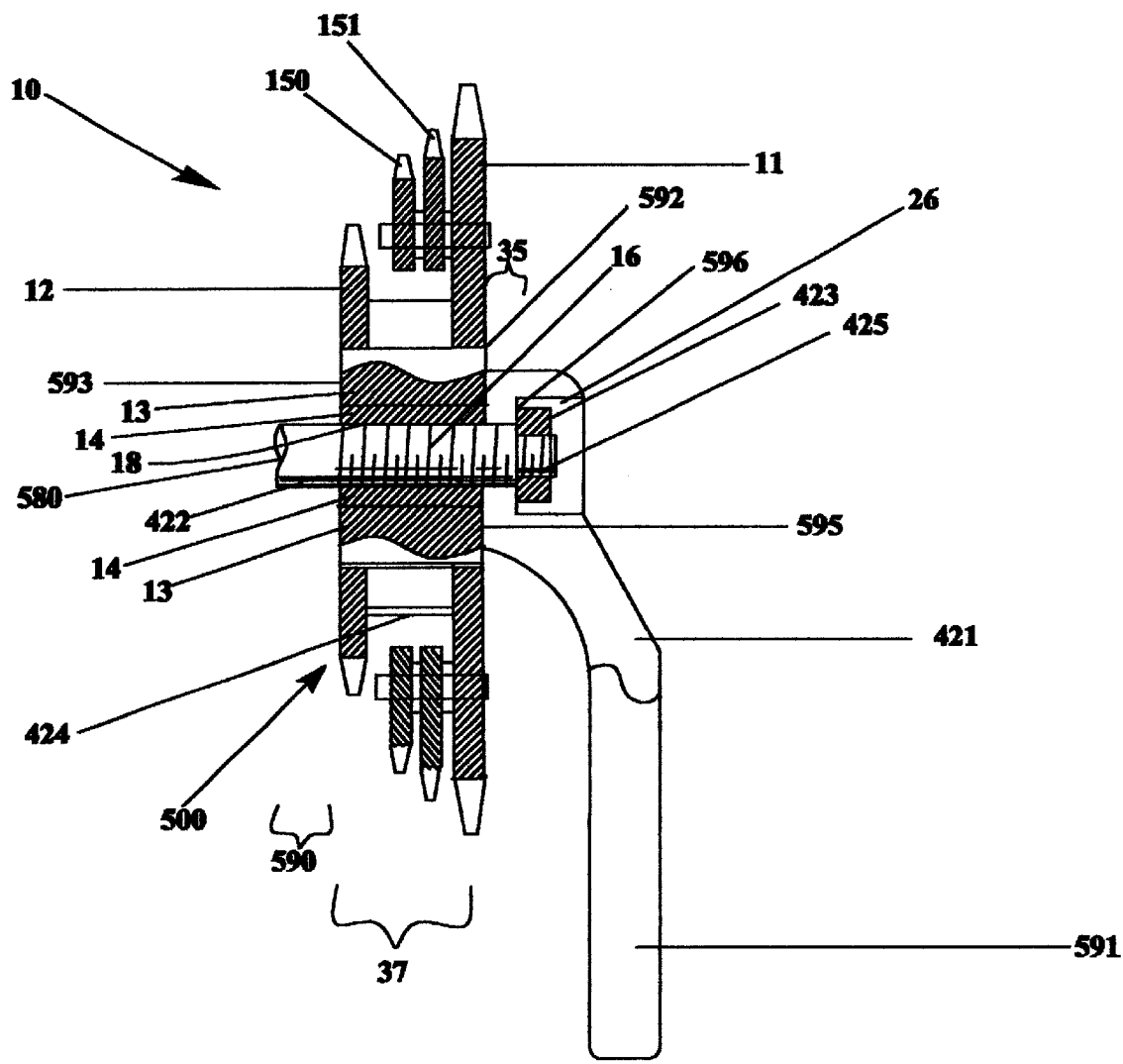
FIGS. 4 and 5 show a cross-section of a front chain wheel assembly in accordance with preferred embodiments of the present invention.

Referring now to FIG. 4, a cross-sectional view of unidirectional rotating assembly 500 a shown (in directing) with axle 422 and crank 421. Unidirectional rotating assembly 500 in this example comprises drive ring 12, spacer/attachment means 424, inner portion or tube shaft 14, a drive side surface 592, an axle surface 593, and shaft sleeve 13. Axle 422 will rotate about axis 580. In this embodiment, unidirectional rotating assembly 500 is coupled to chainrings 11, 150, and 151. Axle 422 has a threaded portion 37, a threaded portion 35, a threaded bolt portion 425, and a smooth portion 590. Inner portion or tube shaft 14 defines an opening 16 for coupling to an axle. Crank 421 comprises an arm 591 to which pedal 42 (not shown) may be attached, an opening 16, an inner surface 595, a mating surface 596, and a recess 26.

In this example, inner portion or tube shaft 14 has an inner surface 18 which is threaded. Threaded inner surface 18 mates with the threaded portion 37 of axle 422. These two threaded portions couple unidirectional rotating assembly 500 to axle 422. Shaft sleeve 13 is coupled to drive ring 12. This coupling can be any coupling known to those skilled in the art. For example, the coupling can be welding, having two threaded portions, gluing, mechanical attachment means such as bolts, bolt holes, and nuts, etc.

Drive side surface 592 of unidirectional rotating assembly 500 abuts inner surface 595 of crank 421. Opening 16 in crank 591 in this example is threaded and mates with threaded portion 35 of axle 422. These two threaded portions couple the crank 421 to the axle 422. Nut 423 defines an opening 16 that is threaded and mates with threads on threaded bolt portion 425. Nut 423 further couples crank 421 to axle 422.

Spacer/attachment means 424 can merely be a spacer to allow separation between chain 22 (not shown; see FIG. 1 or 2) or can couple chainring 11 (and/150 and 151) to the unidirectional rotating mechanism 500. Such coupling could include gluing, welding, having mating threads on shaft sleeve 13 and chainring 11 (and/or 150 and 151), adding material having bolt holes/nuts to sleeve 13, adding bolt holes to chainrings 11, 150, and 151, thereby allowing bolts (and nuts) to couple chainrings 11, 150 and 151 to unidirectional rotating mechanism 500. As is well known by those skilled in the art, most crank sets are already designed with bolts and nuts to hold the chainrings onto the crank.

Moreover, unidirectional rotating mechanism 500 may be designed such that is relatively thin. In this embodiment, the unidirectional rotating assembly can allow a normal crank, complete with chainrings and attachment mechanisms to attach the rings to the crank, to be easily and simply added. This configuration would place unidirectional rotating mechanism 500, having a drive ring 12, between the crank, having and coupled to one or more chainrings, and the frame of the bicycle. This would make insertion of the unidirectional rotating mechanism very easy, although the axle might have to be slightly longer than normal to fit both the unidirectional rotating mechanism and crank.

Many current axles are not threaded and have a recessed portion that is threaded and into which a bolt is threaded after passing through an opening in the crank. To cause the rotational movement of crank to cause rotational movement of the axle, the opening in the crank is usually somewhat square in the axle, on its end, is also relatively square. These two square surfaces mate the axle to the crank. Other axle designs are hollow, having circumferentially spaced male "keys" on the periphery of the axle that interlock with circumferentially spaced female keys on the interior circumference of the crank. For example, bicycle manufacturer SHIMANO's 2000 edition of its XTR bottom bracket and crankset have this configuration. Unidirectional rotating assembly 500 may easily be adapted for these types of cranks and axles. For example, portion 37 of axle 422 can be somewhat square, and inner surface 18 of tube shaft 14 can be made square to couple with this.

Figure 5:
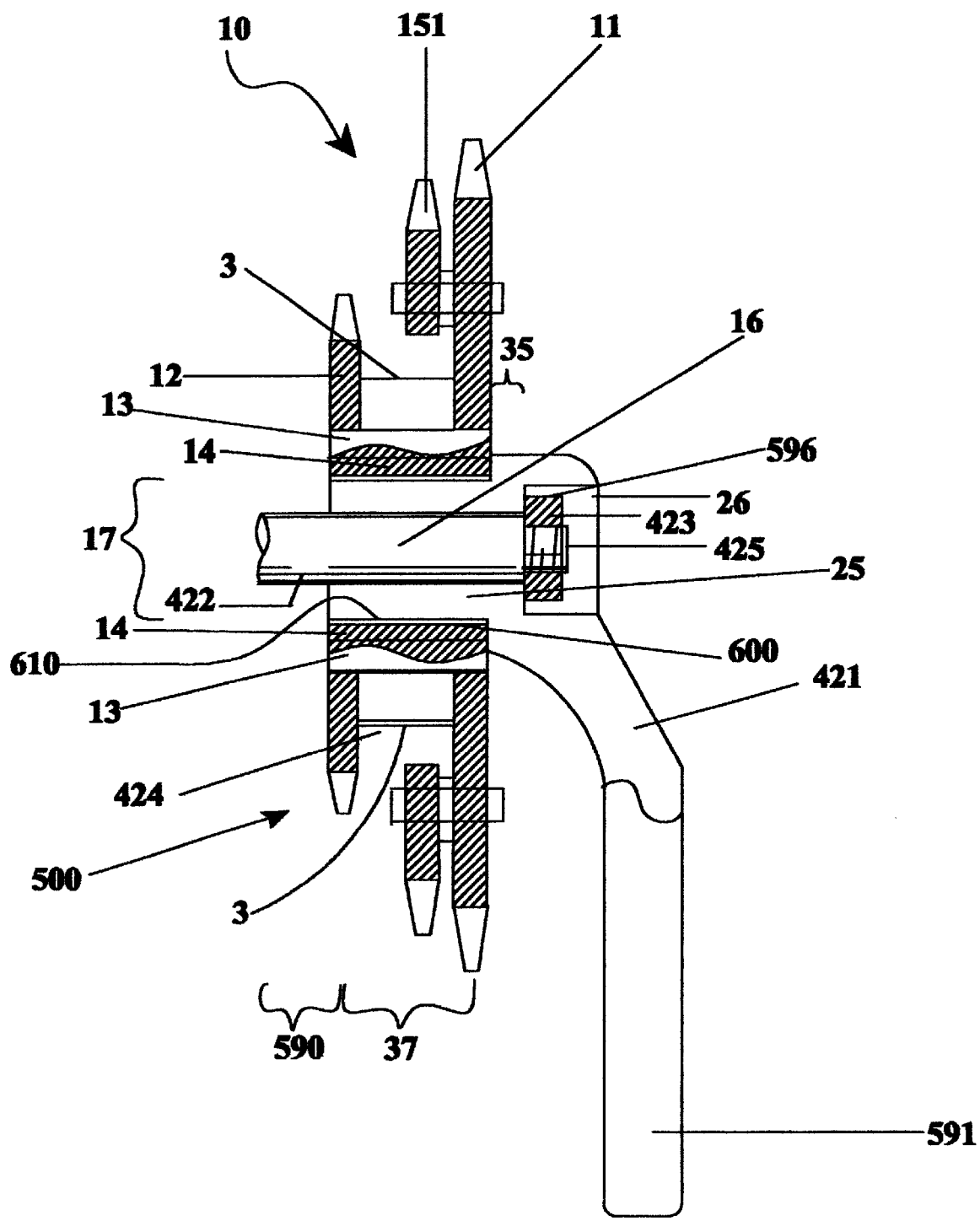

Referring now to FIG. 5, another preferred embodiment of unidirectional rotating mechanism 500 is shown cooperating with crank 421 and 422. In this example, tube shaft 14 defines a larger opening 16, shown being the width of width 17. Inner surface 600 of tube shaft 14 mates with outer surface 610 of tubular portion 25 of crank 421. To couple tube shaft 14 with axle 422, mating surface 35 of axle 422, in this example, has a relatively square shape. Crank 421 has its own mating surface 35 that mates to mating surface 35 of axle 422. These mating surfaces couple rotational motion of crank 421 to rotational motion of axle 422. Unidirectional rotating mechanism 500 preferably couples to drive ring 12 and chainrings 11, 150, and 155. Unidirectional rotating mechanism 500 couples to axle 422 through tubular portion 25 of crank 421 and tube shaft 14, which mates with tubular portion 25 of crank 421. To couple tube shaft 14 to tubular portion 25, these mechanisms may be threaded, welded, glued, or be attached through any attachment method known to those skilled in the art.

As before, unidirectional rotating mechanism 500 can be made thin to allow the crank to be coupled to the chainring or chainrings, such that the chainrings and crank are separate from unidirectional rotating mechanism 500. It is important to note that in this configuration, the inner surface of the unidirection rotating mechanism defines an opening suitable for coupling to an axle, but the axle in this example is coupled to the inner surface by the crank's tubular potion 25.

Figure 6B:
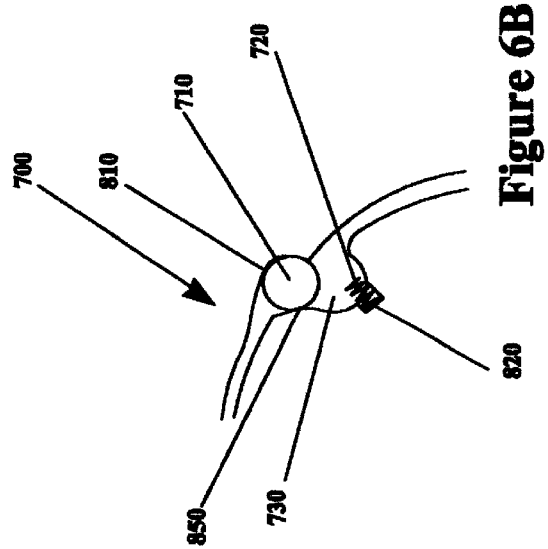
FIG. 6 shows a cross-section of another preferred unidirectional rotating assembly.
Figure 6A:
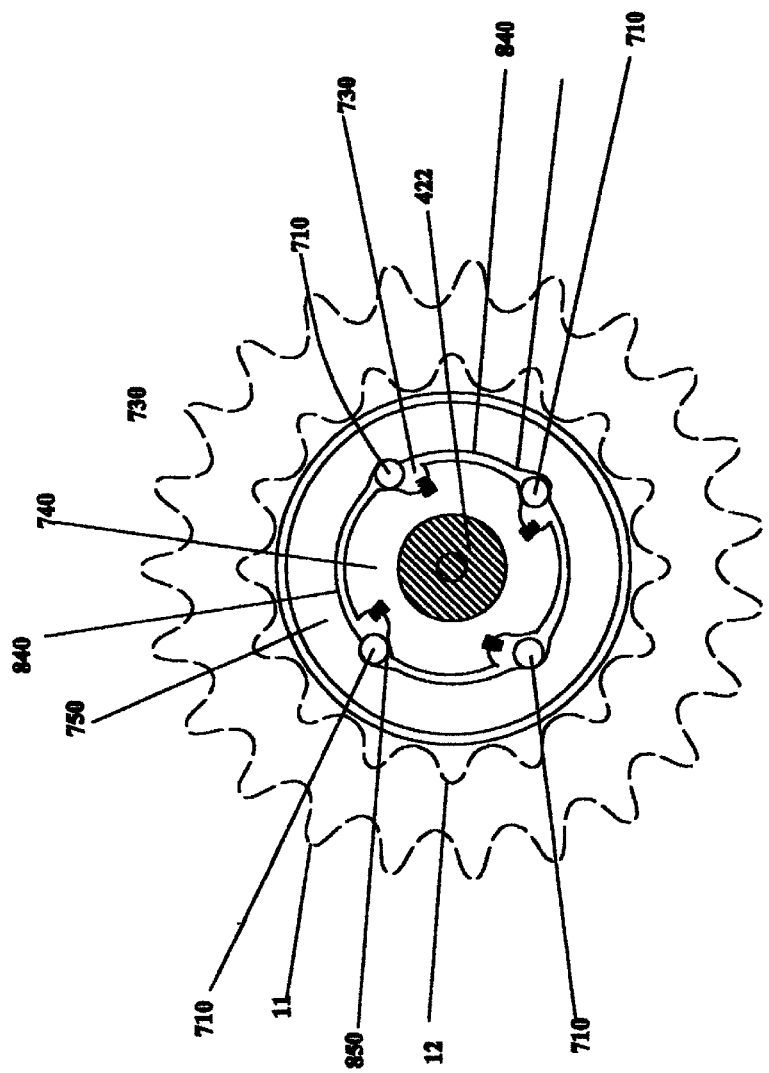

Turning now to FIG. 6, another preferred unidirectional rotating assembly is shown. This preferred unidirectional rotating assembly is known as a "one-way" bearing. These bearings generally have tighter tolerances than do pawl assemblies, and thus are less preferred than pawl assemblies. In this embodiment, unidirectional rotating assembly 700 comprises a number of locking means 710, a tube shaft 740 having a number of engaging means 730 circumferentially arranged between circular poritons 840, and a sleeve 750 having a number of depressions 810. Tube shaft 740 in this example is coupled to axle 422, and other coupling mechanisms for coupling tube shaft 740 to axle 422 (such as that shown in FIG. 5) may be used. Each engaging means comprises a forcing means 720, which in this example is partially contained in recess 820, and a mating surface 850. Each locking means 710 normally resides in a depression 810 (thereby squeezed between a depression and a mating surface 850 of one of the engaging means 730) or substantially within an engaging means 730. It should be noted that when a locking means 710 resides in a depression 810, it will still partially reside in an engaging means 730. It should also be noted that there will be transition periods wherein a locking means is not quite residing in a depression 810, yet is not substantially in an engaging means 730. While the example of FIG. 6 only has four engaging means, this is only an example, and more or less engaging means may be used. Locking means 710 may be a ball, a tube, a shaft, a solid cylinder, or any other means able to wedge between the depression and the mating surface and also able to reside substantially in an engaging means.

When shaft sleeve 750 rotates (at least as fast as axle 422), a locking means residing in the depression will be pushed slightly toward an engaging means by the depression. A circular portion of the shaft sleeve will then push the locking means further into an engaging means, forcing the locking means onto the forcing means and compressing the forcing means. When all the locking means are substantially inside engaging means, the shaft sleeve 750 is relatively free to rotate. While there will be some amount of friction, this amount is generally inconsequential. Thus, the shaft sleeve (and chainring 11 or drive ring 12) is allowed to move while the axle can remain still or move at a slower rotational speed than the shaft sleeve.

When axle 422 rotates (at least as fast as shaft sleeve 750), each forcing means 720 will force its associated locking means out of the engaging means. Because the tube shaft 740 rotates, the locking means will roll up one surface of the engaging means until it rests on the mating surface 850. The locking means will then be trapped between the mating surface 850 and the depression 810 of the sleeve. This couples the axle to the shaft sleeve, and thereby to the chainring 11 or drive ring 12. It should be noted that the depression 810 is not necessary, as the proper design of the surfaces of the engaging means will allow the locking means to grip the surface of both the engaging means and the shaft sleeve. Depressions are preferred, however, as they provide a defined place in which the locking means may rest, thereby allowing larger tolerances and a larger surface engaging surface.

As described above, a unidirectional rotating assembly, a bicycle powering mechanism, and a bicycle using the same are disclosed. The unidirectional rotating assembly allows a chainring to rotate while a crank and an axle remain still. The bicycling powering mechanism combines the unidirectional rotating assembly with a powering device. The powering device is coupled to the unidirectional rotating assembly through a drive ring. This allows the powering device to drive the unidirectional assembly, thereby driving the chainring. When the bicycling power mechanism is part of a bike, the chainring is connected to the rear wheel of the bike through a chain and rear sprockets. Because of this, the bicycling powering mechanism can propel the bike while the cranks are stationary. Additionally, a person using a bike having this configuration is still able to shift gears. Thus, the bicycling power mechanism need not be designed with gearing. Moreover, the rider can select the appropriate gear such that the bicycling power mechanism will not drive the bike too slowly (such as if a hill is encountered) or too fast (such as if a downhill is encountered).

This invention has the benefits of being much less complicated while giving the rider appropriate control over speed through gearing selection. Moreover, the rider need not apply any force to move the bike. However, should the rider decide to add force and thus go faster, the present invention allows the rider to do so.

The unidirectional rotating assembly can also be applied to a multi-passenger bicycle for two or more individuals riding a bicycle together. This allows one or more of the riders to provide no power input to the bike while the other rider or riders provides all the power input. The present invention has a benefit of being much less complicated than prior art systems. By using the unidirectional rotating assembly, the involved and complex multiple chains, cogs, and other complicated systems are not needed.

What is claimed is:

1. A bicycle comprising:
   an axle;
   a crank coupled to the axle and able to rotate the axle;
   at least one chainring; and
   a unidirectional rotating assembly coupled to the axle, or to the crank and then to the axle, and the at least one chainring,
      wherein the unidirectional rotating assembly allows movement of the crank in a first direction to cause movement of the at least one chainring in the first direction, and allows movement of the at least one chainring in the first direction while the crank can remain still, and wherein the unidirectional rotating assembly comprises:
         a pawl assembly comprising at least one pawl coupled to the axle;
         at least one pawl spring; and
         a plurality of circumferentially spaced engaging means coupled to the at least one chainring, wherein there is one pawl spring for each pawl, wherein when the at least one pawl rotates in a first direction each pawl spring forces its associated pawl to engage one of the engaging means, thereby allowing movement of the crank to cause movement of the at least one chainring, and wherein when the at least one pawl rotates in a second direction each pawl will be compressed onto its associated spring by one of the plurality of engaging means, thereby allowing the crank to remain still while the chainring can rotate, and
      wherein the axle has a threaded portion on an outer surface of the axle, wherein the at least one pawl is coupled to an outer surface of a tube shaft that also comprises a threaded inner surface, wherein the threaded portion on the outer surface of the axle cooperates with the threaded inner surface of the tube shaft to couple the axle to the at least one pawl, wherein the crank comprises a threaded opening, and wherein the threaded portion on the outer surface of the axle cooperates with the threaded opening of the crank to couple the crank to the axle.

2. The bicycle of claim 1 wherein the axle comprises a first axle, wherein the crank comprises a first crank, wherein the at least one chainring comprises an at least one first chainring, wherein the bicycle further comprises a second axle coupled to a second crank that is coupled to an at least one second chainring, wherein the at least one first and second chainrings are coupled such that movement of one of the at least one first or second chainrings causes movement of the other of the at least one first or second chainrings, and wherein the unidirectional rotating assembly allows the at least one second chainring to move in the first direction, thereby causing movement of the at least one first chainring, but allows the first crank to remain still.

3. The bicycle of claim 1 wherein the crank is coupled to the axle and to the at least one pawl, thereby coupling the axle to the at least one pawl.

4. The bicycle of claim 1 wherein the bicycle further comprises a drive ring coupled to the plurality of engaging mechanisms and a powering device coupled to the drive ring, the powering device able to move the drive ring, thereby moving the plurality of engaging mechanisms and the at least one chainring.

5. The bicycle of claim 4 wherein the at least one chainring comprises a plurality of chainrings, wherein the bicycle further comprises a front derailleur, a rear derailleur, and a rear cluster comprising a plurality of sprockets, wherein one of the sprockets is coupled to one of the plurality of chainrings through a chain, and wherein the front derailleur can move the chain from one of the plurality of chainrings to another of the plurality of chainrings, and the rear derailleur can move the chain from one of the plurality of sprockets to another of the plurality of sprockets, the front derailleur or rear derailleur movement occurring while the powering device moves the drive ring.

6. The bicycle of claim 4 wherein the powering device comprises a motor that is coupled to a powering wheel, the powering wheel coupled to the drive ring through a power transfer mechanism.

7. The bicycle of claim 6 wherein the power transfer mechanism is a chain.

8. The bicycle of claim 6 wherein the power transfer mechanism is a belt.

9. The bicycle of claim 4 wherein the each of the plurality of engaging means comprises a tilted teeth in a shaft sleeve, and wherein the shaft sleeve is coupled to the drive ring and the at least one chainring.

10. The bicycle of claim 1 wherein the axle has a mating surface that cooperates with a mating surface on the crank to couple the crank to the axle, thereby allowing the crank to move the axle, wherein the crank has a tubular portion having an opening in which the axle resides and having an outer surface, and wherein the outer surface is coupled to the at least one pawl of the unidirectional rotating assembly.

11. The bicycle of claim 1 wherein the unidirectional rotating mechanism comprises:
- a sleeve coupled to the at least one chainring and comprising a plurality of circumferentially spaced depressions and a plurality of circular portions, each circular portion joining and intermediate two of the plurality of depressions;
- a tube shaft coupled to the inner surface and comprising at least one engaging means, each engaging means comprising a forcing means and a mating surface;
- at least one locking means, each locking means residing at least partially in one of the engaging means, wherein when the crank rotates in a first direction each spring in each engaging means that contains a locking means forces its associated locking means between the mating surface of its associated engaging means and one of the depressions, thereby coupling the crank to the sleeve and allowing movement of the inner surface to cause movement of the drive ring, and wherein when the at least one chainring rotates in the first direction each locking means will be forced by a circular portion of the sleeve substantially into one of the engaging means, thereby compressing one of the forcing means and allowing the crank to remain still while the at least one chainring can rotate.

* * * * *